(12) United States Patent
Sasaki

(10) Patent No.: US 10,535,895 B2
(45) Date of Patent: Jan. 14, 2020

(54) SULFIDE SOLID ELECTROLYTE MATERIAL AND BATTERY CONTAINING THE SAME

(71) Applicant: Panasonic Intellectual Property Management Co., Ltd., Osaka (JP)

(72) Inventor: Izuru Sasaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 3 days.

(21) Appl. No.: 15/997,695

(22) Filed: Jun. 5, 2018

(65) Prior Publication Data

US 2018/0366777 A1    Dec. 20, 2018

(30) Foreign Application Priority Data

Jun. 14, 2017    (JP) .................. 2017-116623

(51) Int. Cl.
*H01M 4/02* (2006.01)
*H01M 10/0562* (2010.01)
*H01M 10/052* (2010.01)
*H01M 4/133* (2010.01)
*H01M 4/131* (2010.01)
*H01M 4/134* (2010.01)
*H01B 1/06* (2006.01)
*H01M 10/48* (2006.01)

(52) U.S. Cl.
CPC ....... *H01M 10/0562* (2013.01); *H01M 4/131* (2013.01); *H01M 4/133* (2013.01); *H01M 4/134* (2013.01); *H01M 10/052* (2013.01); *H01B 1/06* (2013.01); *H01M 10/48* (2013.01); *H01M 2004/027* (2013.01); *H01M 2004/028* (2013.01); *H01M 2300/0065* (2013.01)

(58) Field of Classification Search
CPC ...................................................... H01M 4/02
See application file for complete search history.

(56) References Cited

U.S. PATENT DOCUMENTS

2012/0177997 A1* 7/2012 Nakamoto .......... H01M 10/052
                                                    429/306
2016/0149261 A1* 5/2016 Zaghib .................. H01M 4/136
                                                    429/94

FOREIGN PATENT DOCUMENTS

JP            2016-027554            2/2016

* cited by examiner

*Primary Examiner* — Jacob B Marks
(74) *Attorney, Agent, or Firm* — McDermott Will & Emery LLP

(57) ABSTRACT

A sulfide solid electrolyte material comprises phosphorus and sulfur. With regard to the sulfide solid electrolyte material, x satisfies $0.00926 \leq x \leq 0.37$, where a first peak is a peak in a range of not less than 87.5 ppm and not more than 88.5 ppm, the peak being determined by Gaussian curve fitting of a $^{31}$P-NMR spectrum, a second peak is a peak in a range of not less than 84.2 ppm and not more than 85.2 ppm, the peak being determined by Gaussian curve fitting of the $^{31}$P-NMR spectrum, and a ratio of integrated intensity of the first peak to integrated intensity of the second peak is represented by $x:1-x$.

6 Claims, 3 Drawing Sheets

SULFIDE SOLID ELECTROLYTE MATERIAL AND BATTERY CONTAINING THE SAME

BACKGROUND

1. Technical Field

The present disclosure relates to a sulfide solid electrolyte material and a battery containing it.

2. Description of the Related Art

A lithium secondary battery has a positive electrode, a negative electrode, and an electrolyte layer disposed therebetween. The electrolyte layer contains a non-aqueous liquid or solid electrolyte. Since commonly used liquid electrolytes are inflammable, a lithium secondary battery containing a liquid electrolyte requires a system that ensures safety. Solid electrolytes are nonflammable and therefore only need to have a simple safety system. A battery containing a solid electrolyte is referred to as an all-solid-state battery.

Solid electrolytes are roughly divided into organic and inorganic ones. The former is also called polymer solid electrolytes. Because of the ionic conductivity of approximately $10^{-6}$ S/cm of an organic solid electrolyte at room temperature, an all-solid-state battery containing an organic solid electrolyte is difficult to operate at room temperature. The latter includes oxide and sulfide solid electrolytes.

Japanese Unexamined Patent Application Publication No. 2016-27554 discloses a sulfide solid electrolyte having a crystallinity of 20% or more and 99% or less.

SUMMARY

A problem with sulfide solid electrolytes is that they often produce hazardous hydrogen sulfide.

One non-limiting and exemplary embodiment provides a sulfide solid electrolyte material that offers high ionic conductivity and low hydrogen sulfide production.

In one general aspect, the techniques disclosed here feature a sulfide solid electrolyte material. The sulfide solid electrolyte material contains phosphorus and sulfur. With regard to the sulfide solid electrolyte material, x satisfies $0.00926 \leq x \leq 0.37$, where a first peak is a peak in a range of not less than 87.5 ppm and not more than 88.5 ppm, the peak being determined by Gaussian curve fitting of a $^{31}$P-NMR spectrum, a second peak is a peak in a range of not less than 84.2 ppm and not more than 85.2 ppm, the peak being determined by Gaussian curve fitting of the $^{31}$P-NMR spectrum, and a ratio of integrated intensity of the first peak to integrated intensity of the second peak is represented by x:1−x.

It should be noted that general or specific embodiments may be implemented as a material, a battery, apparatus, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
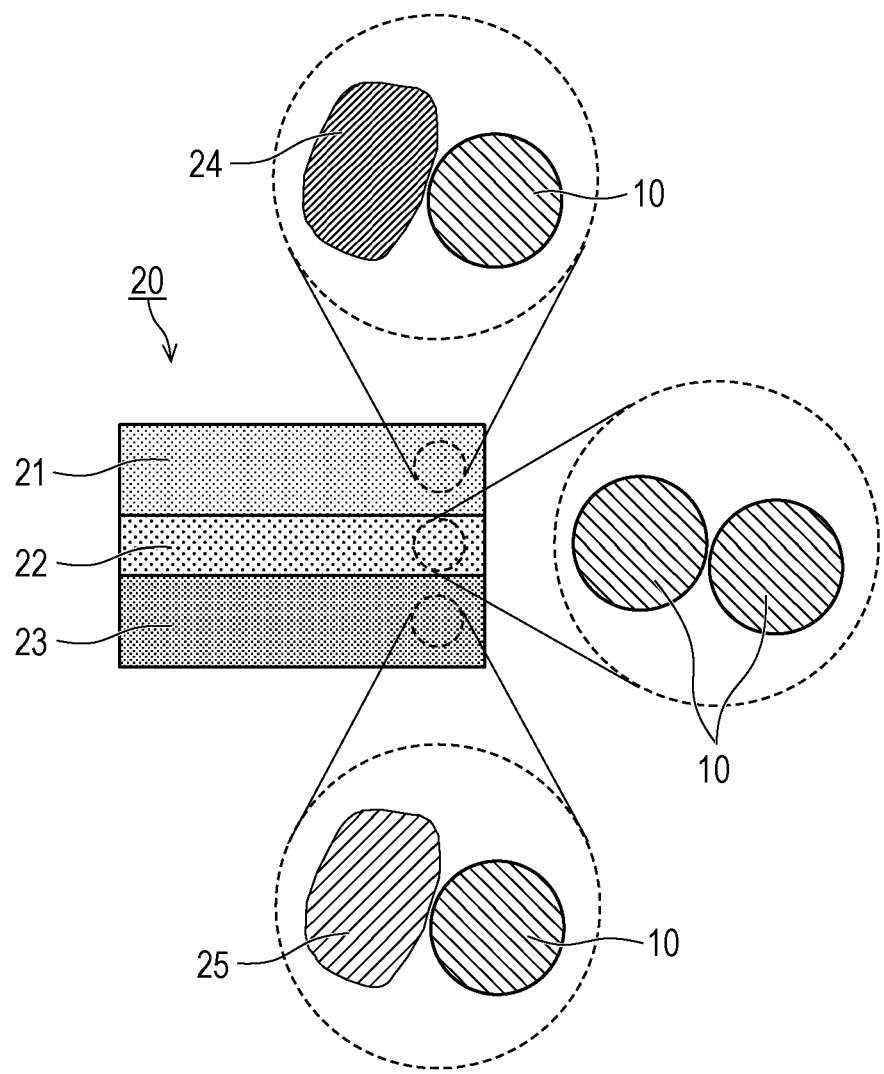
FIG. 1 is a schematic cross-sectional view of a battery according to Embodiment 2.

Underlying Knowledge Forming Basis of the Present Disclosure

A sulfide solid electrolyte material that contains phosphorus (P) and sulfur (S) can take various forms including crystalline $PS_4$, vitreous $PS_4$, crystalline $P_2S_6$, vitreous $P_2S_6$, crystalline $P_2S_7$, and vitreous $P_2S_7$. This means that phosphorus and sulfur form a plurality of types of P—S bonds in a sulfide solid electrolyte material. The form of P—S bonds can be identified by $^{31}$P-NMR. For example, the $^{31}$P-NMR spectrum of vitreous $PS_4$ exhibits a peak near 84.7 ppm. The $^{31}$P-NMR spectrum of crystalline $PS_4$ exhibits a peak near 88.0 ppm. The $^{31}$P-NMR spectrum of crystalline $P_2S_7$ exhibits a peak near 90.5 ppm. The $^{31}$P-NMR spectrum of vitreous $P_2S_6$ exhibits a peak near 108 ppm. The higher the percentage of crystalline phases is, the higher the ionic conductivity of the sulfide solid electrolyte material is. The term "near" used herein in relation to the position of a peak means that the peak appears within ±0.5 ppm of the indicated chemical shift. For example, the $^{31}$P-NMR spectrum of vitreous $PS_4$ exhibits a peak near 84.7 ppm, and this means that the peak appears in a range of not less than 84.2 ppm and not more than 85.2 ppm. Likewise, the $^{31}$P-NMR spectrum of crystalline $PS_4$ exhibits a peak near 88.0 ppm, and this means that the peak appears in a range of not less than 87.5 ppm and not more than 88.5 ppm.

As a result of extensive research, the inventor identified the ratio of crystalline to vitreous $PS_4$ as a strong determinant of hydrogen sulfide production and, by adjusting this ratio, found a sulfide solid electrolyte material that offers high ionic conductivity and low hydrogen sulfide production.

A sulfide solid electrolyte material according to a first aspect of the present disclosure contains phosphorus and sulfur. With regard to the sulfide solid electrolyte material, x satisfies $0.00926 \leq x \leq 0.37$, where a first peak is a peak near 88.0 ppm, the peak being determined by Gaussian curve fitting of a $^{31}$P-NMR spectrum, a second peak is a peak near 84.7 ppm, the peak being determined by Gaussian curve fitting of the $^{31}$P-NMR spectrum, and a ratio of integrated intensity of the first peak to integrated intensity of the second peak is represented by x:1−x.

When x is smaller than 0.00926, the sulfide solid electrolyte material has in low ionic conductivity. When x is larger than 0.37, production of hydrogen sulfide may increase. When $0.00926 \leq x \leq 0.37$, therefore, the sulfide solid electrolyte combines high ionic conductivity with low hydrogen sulfide production.

In a second aspect of the present disclosure, the sulfide solid electrolyte material according to the first aspect is, for example, a compound consisting essentially of lithium, phosphorus, and sulfur. A lithium-containing sulfide solid electrolyte material is useful as the electrolyte in a lithium-ion battery.

In a third aspect of the present disclosure, the compound that is the sulfide solid electrolyte material according to the second aspect has a chemical composition of, for example, $Li_3PS_4$. In a fourth aspect of the present disclosure, the sulfide solid electrolyte material according to the first aspect contains, for example, $Li_3PS_4$. $Li_3PS_4$ gives a battery high power because of its high ionic conductivity. Moreover, by virtue of its superior stability against reduction, $Li_3PS_4$ can be used with a negative electrode made of a low-potential material, such as graphite or metallic lithium, thereby helping produce a battery with high energy density.

A battery according to a fifth aspect of the present disclosure includes a positive electrode, a negative electrode, and an electrolyte layer between the positive electrode and the negative electrode. At least one selected from the group consisting of the positive electrode, negative electrode, and electrolyte layer contains a sulfide solid electrolyte material according to one of the first to third aspects.

In the fifth aspect, the battery offers improved output characteristics and reduced hydrogen sulfide production by virtue of the sulfide solid electrolyte material contained therein, which combines high ionic conductivity and low hydrogen sulfide production.

In a sixth aspect of the present disclosure, the electrolyte layer of the battery according to the fifth aspect includes a first electrolyte layer and a second electrolyte layer covered with the first electrolyte layer. The first electrolyte layer contains a larger amount, on a mass basis, of the sulfide solid electrolyte material than the second electrolyte layer. In the sixth aspect, the sulfide solid electrolyte material in the first electrolyte layer limits the penetration of water into the second electrolyte layer, reducing the production of hydrogen sulfide resulting from water penetration into the second electrolyte layer.

The following describes embodiments of the present disclosure with reference to the drawings. The present disclosure is not limited to these embodiments.

Embodiment 1

A sulfide solid electrolyte material according to this embodiment contains phosphorus and sulfur. With respect to the sulfide solid electrolyte material, x satisfies $0.00926 \leq x \leq 0.37$, where the peak that is determined by Gaussian curve fitting of a $^{31}P$-NMR spectrum of the material and that exists near 88.0 ppm is defined as a first peak, the peak that is determined by Gaussian curve fitting of the same spectrum and that exists near 84.7 ppm is defined as a second peak, and the ratio of the integrated intensity of the first peak to that of the second peak is represented by x:1−x. The first peak is attributable to crystalline $PS_4$, and the second peak to vitreous $PS_4$. The ratio $x/(1-x)$ of the integrated intensity of the first peak to that of the second peak represents the molar ratio of crystalline to vitreous $PS_4$.

In $^{31}P$-NMR, ammonium phosphate can be used as the chemical shift reference at 0 ppm. Since the state of the magnetic field is not exactly identical between runs, NMR suffers from measurement errors in the output chemical shift. The measurement error is, for example, ±0.5 ppm. The terms "near 88.0 ppm" and "near 84.7 ppm" used herein refer to "88.0±0.5 ppm" and "84.7±0.5 ppm," respectively.

A sulfide solid electrolyte material according to this embodiment may contain any other elements and many have any chemical composition. The sulfide solid electrolyte material can be, for example, $Li_2S$—$P_2S_5$ or a Li—P—S compound and may optionally contain an additive such as a sulfide, e.g., $SiS_2$, $B_2S_3$, $GeS_2$, or $Al_2S_3$; a lithium halide, e.g., LiX (X: F, Cl, Br, or I); or an oxide or lithium oxide, e.g., $Li_2O$, $MO_q$, or $Li_pMO_q$ (M: P, Si, Ge, B, Al, Ga, In, Fe, or Zn) (p, q: natural numbers). For example, a $Li_2S$—$P_2S_5$ containing LiX can be obtained by reacting $Li_2S$, $P_2S_5$, and LiX by heat treatment, mechanical milling, or any other method to form the compound. Adding such a compound provides many benefits, including improved electroconductivity, improved chemical stability, and reduced interfacial resistances.

A sulfide solid electrolyte material according to this embodiment may have a particular crystal structure, such as $Li_3PS_4$, $Li_4P_2S_6$, $Li_7P_3S_{11}$, $Li_{3.25}Ge_{0.25}P_{0.75}S_4$, $Li_{10}GeP_2S_{12}$, $LidSi_{1.74}P_{1.44}S_{11.7}Cl_{0.3}$, or $Li_6PS_5X$ (X: F, Cl, Br, or I). Alternatively, the material may be a glass ceramic, a mixture of crystals and glass.

To determine the ratio of crystalline to vitreous $PS_4$, $^{31}P$-NMR is the most convenient but not the only way. For example, Raman spectroscopy, X-ray diffraction, or a combination thereof can be used to determine the crystalline-vitreous $PS_4$ ratio. The crystalline-vitreous $PS_4$ ratio does not depend on the measuring method. That is, this ratio is unique to the chemical composition and structure of the sulfide solid electrolyte material and does not change even if measured by different methods.

The term "crystalline-vitreous $PS_4$ ratio" used herein refers to the ratio of the number of P—S bonds forming crystalline $PS_4$ (i.e., the number of moles of $PS_4$ in the crystalline phase) to that of P—S bonds forming vitreous $PS_4$ (i.e., the number of moles of $PS_4$ in the glass phase) and is represented by "x:1−x."

In the sulfide solid electrolyte material, crystalline $PS_4$ may exist as nanocrystals of nanometer size or crystal domains measuring hundreds of nanometers to micrometers. The distribution of each of the crystalline and vitreous $PS_4$ inside the sulfide solid electrolyte material (e.g., inside the particles of the material) may be uniform or nonuniform.

In this embodiment, the sulfide solid electrolyte material can be a compound consisting essentially of lithium, phosphorus, and sulfur. A lithium-containing sulfide solid electrolyte material is useful as the electrolyte in a lithium-ion battery. The chemical composition of the sulfide solid electrolyte material may be $Li_3PS_4$. $Li_3PS_4$ gives a battery high power because of its high ionic conductivity. Moreover, by virtue of its superior stability against reduction, $Li_3PS_4$ can be used with a negative electrode made of a low-potential material, such as graphite or metallic lithium, thereby helping produce a battery with high energy density.

The term "consisting essentially of" used herein means that the mentioned compound contains no other element that would change the essential characteristics of the compound.

A sulfide solid electrolyte material configured as above offers high ionic conductivity and low hydrogen sulfide production.

A sulfide solid electrolyte material according to this embodiment can be produced by the following method.

Precursor materials containing, for example, $Li_2S$, $P_2S_5$, Li, P, and S are reacted by melt extraction, mechanochemical milling, or any other method. This gives a sulfide solid electrolyte material containing vitreous $PS_4$. Heating the resulting vitreous sulfide solid electrolyte material initiates the crystallization of $PS_4$, giving a sulfide solid electrolyte material containing crystalline and vitreous $PS_4$. The crystalline-vitreous $PS_4$ ratio can be controlled by performing the heating process at an appropriate temperature for an appropriate time.

The heating temperature is not critical as long as it is equal to or higher than the crystallization point of $PS_4$. For example, the heating temperature is 200° C. or more. Crystallization proceeds faster with increasing heating temperature. There is no upper limit, and the heating temperature can be, for example, 400° C. The duration of heating is not critical either. Longer heating leads to higher crystallinity, and higher crystallinity results in higher ionic conductivity. The duration of heating can be, for example, 5 hours or less and may alternatively be 30 minutes or less. There is no lower limit, and the duration of heating can be, for example, 1 minute.

It should be noted that post-heating is optional. For example, melt extraction performed at an appropriate heating temperature and an appropriate quenching speed gives a sulfide solid electrolyte material with a desired crystalline-vitreous $PS_4$ ratio without heating thereafter. Likewise, mechanochemical milling performed at an appropriate rotation speed for an appropriate duration gives a sulfide solid electrolyte material with a desired crystalline-vitreous $PS_4$ ratio without heating thereafter.

A sulfide solid electrolyte material according to this embodiment can also be produced by the following method, in which an organic solvent is used.

Precursor materials containing, for example, $Li_2S$, $P_2S_5$, Li, P, and S are reacted in an organic solvent. Examples of the organic solvent that can be used include tetrahydrofuran, ethyl propionate, methyl propionate, ethyl acetate, N-methylformaldehyde, dimethoxyethane, acetonitrile, and mixtures thereof. During the reaction of the precursor materials, the reaction mixture may be warmed, vibrated with a milling medium, or supplied with energy, for example by sonication. The mixture is then dried, for example by heating or evacuation, to remove the organic solvent. Crystallization proceeds with the removal of the organic solvent, leaving a sulfide solid electrolyte material containing crystalline and vitreous $PS_4$. Optimizing parameters such as the precursor materials and organic solvent used, the duration of reaction, the reaction temperature, and the drying conditions for the removal of the organic solvent will give the resulting sulfide solid electrolyte material a desired crystalline-vitreous $PS_4$ ratio.

Embodiment 2

In Embodiment 2, what is described in Embodiment 1 is not repeated unless necessary. A battery according to Embodiment 2 incorporates a sulfide solid electrolyte material described in Embodiment 1.

As illustrated in FIG. 1, a battery 20 according to this embodiment includes a positive electrode 21, a negative electrode 23, and an electrolyte layer 22. The positive electrode 21 contains a particulate positive electrode active material 24. The positive electrode 21 may further contain a sulfide solid electrolyte material 10 described in Embodiment 1. The electrolyte layer 22 is between the positive electrode 21 and the negative electrode 23. The electrolyte layer 22 is in contact with both the positive electrode 21 and negative electrode 23. The electrolyte layer 22 may contain the sulfide solid electrolyte material 10. The negative electrode 23 contains a particulate negative electrode active material 25. The negative electrode 23 may contain the sulfide solid electrolyte material 10. The battery 20 is, for example, an all-solid-state lithium secondary battery. A battery 20 according to this embodiment combines superior output characteristics with reduced hydrogen sulfide production by virtue of containing a sulfide solid electrolyte material 10 described in Embodiment 1.

In this embodiment, the sulfide solid electrolyte material 10 may be contained in each of the positive electrode 21, negative electrode 23, and electrolyte layer 22. It is desirable that at least the electrolyte layer 22 contain the sulfide solid electrolyte material 10 according to the present disclosure. The electrolyte layer 22 is the most electrolyte-rich of the positive electrode 21, negative electrode 23, and electrolyte layer 22, which means that using a sulfide solid electrolyte material 10 according to the present disclosure in the electrolyte layer 22 reduces the hydrogen sulfide production of the battery 20 most effectively. The advantage of reduced hydrogen sulfide production, however, is preserved as long as at least one of the group consisting of the positive electrode 21, negative electrode 23, and electrolyte layer 22 contains the sulfide solid electrolyte material 10. Each of the positive electrode 21, negative electrode 23, and electrolyte layer 22 may contain a sulfide solid electrolyte material other than the sulfide solid electrolyte material 10 according to the present disclosure.

The shape of the sulfide solid electrolyte material 10 is not critical. The sulfide solid electrolyte material 10 can be in the shape of, for example, needles, flakes, spheres, or ellipsoids. The sulfide solid electrolyte material 10 can be particles. When the sulfide solid electrolyte material 10 is particles (e.g., in the shape of spheres), the median diameter (d50) of the sulfide solid electrolyte material 10 can be 100 μm or less. An appropriately sized sulfide solid electrolyte material 10 in the positive electrode 21 or negative electrode 23 is dispersed well together with other materials in the electrode, such as the active material and a conductive additive. Moreover, an appropriately sized sulfide solid electrolyte material 10 in the electrolyte layer 22 allows the layer to be sufficiently thin. These help to improve the discharge characteristics of the battery 20.

The median diameter of the sulfide solid electrolyte material 10 may be 10 μm or less. This leads to better dispersion of the sulfide solid electrolyte material 10 and other materials, such as an active material and a conductive additive.

The median diameter of the sulfide solid electrolyte material 10 may be smaller than that of the particulate positive electrode or negative electrode active material. This leads to better dispersion of the sulfide solid electrolyte material 10 and the particulate active material. There is no lower limit, and the median diameter of the sulfide solid electrolyte material 10 can be, for example, 0.01 μm.

The median diameter of a particulate material as mentioned herein refers to the particle diameter at which the cumulative volume of the particles in their particle size distribution, for example measured using a laser diffraction particle size analyzer, is 50% (d50).

The positive electrode 21 contains a material that stores and releases a metallic ion, such as the lithium ion. The positive electrode 21 contains, for example, a positive electrode active material (an example is the particulate positive electrode active material 24). The positive electrode 21 may contain the sulfide solid electrolyte material 10.

The positive electrode active material can be, for example, a lithium-containing transition metal oxide, a lithium-free transition metal oxide, a transition metal fluoride, a polyanionic compound, a fluorinated polyanionic compound, a transition metal sulfide, a transition metal oxyfluoride, a transition metal oxysulfide, and a transition metal oxynitride. In particular, a lithium-containing transition metal oxide, when used as the positive electrode active material, reduces the production costs of the battery 20 and increases the average discharge voltage of the battery 20.

The positive electrode 21 may contain at least one selected from the group consisting of $Li(NiCoAl)O_2$ and LiCoO$_2$ as positive electrode active material(s). These transition metal oxides can give the battery 20 a high energy density.

The median diameter of the particulate positive electrode active material 24 can be 0.1 μm or more and 100 μm or less. A particulate positive electrode active material 24 having an appropriate size is dispersed well together with a sulfide solid electrolyte material 10 in the positive electrode 21 and, moreover, is favorable for high-power operation of the battery 20 because such a material allows lithium ions to diffuse thereinto quickly. The median diameter of the particulate positive electrode active material 24 may be larger than that of particles of the sulfide solid electrolyte material 10. This leads to good dispersion of the particulate positive electrode active material 24 and sulfide solid electrolyte material 10.

In the positive electrode 21, the percentage of the volume of the particulate positive electrode active material 24 to the total volume of the particulate positive electrode active material 24 and sulfide solid electrolyte material 10, or percentage v, is, for example, 30% or more and 95% or less. The percentage of the volume of the sulfide solid electrolyte material 10 to the total volume of the particulate positive electrode active material 24 and sulfide solid electrolyte material 10, or (100-v), is, for example, 5% or more and 70% or less. A particulate positive electrode active material 24 and a sulfide solid electrolyte material 10 present in appropriate proportions give the battery 20 a sufficiently high energy density and enables high-power operation of the battery 20.

The thickness of the positive electrode 21 can be 10 μm or more and 500 μm or less. A positive electrode 21 having an appropriate thickness gives the battery 20 a sufficiently high energy density and enables high-power operation of the battery 20.

The electrolyte layer 22 contains a sulfide solid electrolyte material 10 according to the present disclosure. The electrolyte layer 22 may further contain a second sulfide solid electrolyte material different from the sulfide solid electrolyte material 10. The sulfide solid electrolyte material 10 and the second sulfide solid electrolyte material may be dispersed uniformly in the electrolyte layer 22. The second sulfide solid electrolyte material has, for example, a chemical composition different from that of the sulfide solid electrolyte material 10 and may have a structure different from that of the sulfide solid electrolyte material 10. For example, the crystalline-vitreous PS$_4$ ratio may be between the sulfide solid electrolyte material 10 and the second sulfide solid electrolyte material.

The thickness of the electrolyte layer 22 can be 1 m or more and 500 μm or less. An electrolyte layer 22 having an appropriate thickness reliably prevents a short-circuit from being created between the positive electrode 21 and negative electrode 23 and enables high-power operation of the battery 20.

Figure 2:
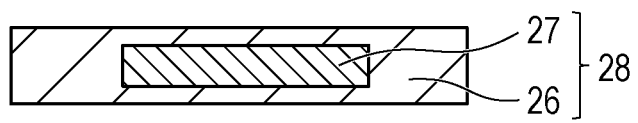
FIG. 2 is a schematic cross-sectional view of an electrolyte layer according to a variation.

Instead of the electrolyte layer 22, the battery 20 may have the electrolyte layer 28 illustrated in FIG. 2. The electrolyte layer 28 has a first electrolyte layer 26 and a second electrolyte layer 27. The second electrolyte layer 27 is covered with the first electrolyte layer 26. More specifically, the second electrolyte layer 27 is enveloped in the first electrolyte layer 26. The two primary surfaces of the electrolyte layer 28 are formed by the first electrolyte layer 26, although part of the second electrolyte layer 27 may be exposed on the surface of the electrolyte layer 28. The term "primary surface" means that the surface is the largest, in area, on the layer.

The first electrolyte layer 26 contains a sulfide solid electrolyte material 10 according to the present disclosure. The second electrolyte layer 27 may contain the sulfide solid electrolyte material 10, a second sulfide solid electrolyte material, or both. The first electrolyte layer 26 may contain a larger amount, on a mass basis, of the sulfide solid electrolyte material 10 than the second electrolyte layer 27.

In the electrolyte layer 28, in FIG. 2, the first electrolyte layer 26 extends around the second electrolyte layer 27, and the second electrolyte layer 27 is protected by the first electrolyte layer 26. The sulfide solid electrolyte material 10 in the first electrolyte layer 26 limits the penetration of water into the second electrolyte layer 27, reducing the production of hydrogen sulfide resulting from water penetration into the second electrolyte layer 27. It is therefore possible to use in the second electrolyte layer 27 an electrolyte material that more easily generates hydrogen sulfide in exchange for higher ionic conductivity. This would further increase the ionic conductivity of the battery 20.

The negative electrode 23 contains a material that stores and releases a metallic ion, such as the lithium ion. The negative electrode 23 contains, for example, a negative electrode active material (an example is the particulate negative electrode active material 25). The negative electrode 23 may contain the sulfide solid electrolyte material 10.

The negative electrode active material can be, for example, a metallic material, carbon material, oxide, nitride, tin compound, or silicon compound. The metallic material can be a pure metal or alloy. Examples of the metallic material include metallic lithium and lithium alloys. Examples of the carbon material include natural graphite, coke, graphitizing carbon, carbon fiber, spherical carbon, artificial graphite, and amorphous carbon. For a higher capacity per unit volume, at least one selected from the group consisting of silicon (Si), tin (Sn), a silicon compound, and a tin compound may be used as negative electrode active material(s).

The median diameter of the particulate negative electrode active material 25 can be 0.1 μm or more and 100 μm or less. A particulate negative electrode active material 25 having an appropriate size is dispersed well together with a sulfide solid electrolyte material 10 and, moreover, is favorable for high-power operation of the battery 20 because such a material allows lithium ions to diffuse thereinto quickly. The median diameter of the particulate negative electrode active material 25 may be larger than that of particles of the sulfide solid electrolyte material 10. This leads to good dispersion of the particulate negative electrode active material 25 and sulfide solid electrolyte material 10.

In the negative electrode 23, the percentage of the volume of the particulate negative electrode active material 25 to the total volume of the particulate negative electrode active material 25 and sulfide solid electrolyte material 10, or percentage V, is, for example, 30% or more and 95% or less. The percentage of the volume of the sulfide solid electrolyte material 10 to the total volume of the particulate negative electrode active material 25 and sulfide solid electrolyte material 10, or (100-V), is, for example, 5% or more and 70% or less. A particulate negative electrode active material 25 and a sulfide solid electrolyte material 10 present in appropriate proportions give the battery 20 a sufficiently high energy density and enables high-power operation of the battery 20.

The thickness of the negative electrode 23 can be 10 μm or more and 500 μm or less. A negative electrode 23 having an appropriate thickness gives the battery 20 a sufficiently high energy density and enables high-power operation of the battery 20.

At least one selected from the group consisting of the positive electrode 21, negative electrode 23, electrolyte layer 22, first electrolyte layer 26, and second electrolyte layer 27 may contain a second sulfide solid electrolyte material, different from the sulfide solid electrolyte material 10, added to increase ionic conductivity. The second sulfide solid electrolyte material can be, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ and may optionally contain an additive such as LiX (X: F, Cl, Br, or I), $Li_2O$, $MO_q$, or $Li_pMO_q$ (M: P, Si, Ge, B, Al, Ga, In, Fe, or Zn) (p, q: natural numbers).

At least one selected from the group consisting of the positive electrode 21, negative electrode 23, electrolyte layer 22, first electrolyte layer 26, and second electrolyte layer 27 may contain an oxide solid electrolyte added to increase ionic conductivity. Examples of the oxide solid electrolyte that can be used include NASICON solid electrolytes, represented by $LiTi_2(PO_4)_3$ and its substituted derivatives; (LaLi)$TiO_3$ perovskite solid electrolytes; LISICON solid electrolytes, represented by $Li_{14}ZnGe_4O_{16}$, $Li_4SiO_4$, $LiGeO_4$, and their substituted derivatives; garnet solid electrolytes, represented by $Li_7La_3Zr_2O_{12}$ and its substituted derivatives; $Li_3N$ and its H-substituted derivatives; and $Li_3PO_4$ and its N-substituted derivatives.

At least one selected from the group consisting of the positive electrode 21, negative electrode 23, electrolyte layer 22, first electrolyte layer 26, and second electrolyte layer 27 may contain a halide solid electrolyte added to increase ionic conductivity. Examples of the halide solid electrolyte that can be used include $Li_3InBr_6$, $Li_3InCl_6$, $Li_2FeCl_4$, $Li_2CrCl_4$, and $Li_3OCl$.

At least one selected from the group consisting of the positive electrode 21, negative electrode 23, electrolyte layer 22, first electrolyte layer 26, and second electrolyte layer 27 may contain a complex hydride solid electrolyte added to increase ionic conductivity. Examples of the complex hydride solid electrolyte that can be used include $LiBH_4$—LiI and $LiBH_4$—$P_2S_5$.

At least one selected from the group consisting of the positive electrode 21, negative electrode 23, electrolyte layer 22, first electrolyte layer 26, and second electrolyte layer 27 may contain an organic polymer solid electrolyte added to increase ionic conductivity. The polymer solid electrolyte can be, for example, a compound of a polymer and a lithium salt can be used, and the polymer may have the ethylene oxide structure. With a polymer having the ethylene oxide structure, the polymer solid electrolyte would give the electrode or layer containing it even higher ionic conductivity by virtue of the greater capacity of the polymer to accommodate lithium salt molecules. Examples of the lithium salt that can be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. Not only can a lithium salt selected from these be used alone, but a mixture of two or more selected from these can also be used.

At least one selected from the group consisting of the positive electrode 21, negative electrode 23, electrolyte layer 22, first electrolyte layer 26, and second electrolyte layer 27 may contain a non-aqueous liquid electrolyte, gel electrolyte, or ionic liquid added to make the exchange of lithium ions easier and thereby improve the output characteristics of the battery.

The non-aqueous liquid electrolyte contains a non-aqueous solvent and a lithium salt dissolved therein. The non-aqueous solvent can be, for example, a cyclic carbonate, linear carbonate, cyclic ether, linear ether, cyclic ester, linear ester, or fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoromethyl methyl carbonate, and fluorodimethylene carbonate. Not only can a non-aqueous solvent selected from these be used alone, but a mixture of two or more selected from these can also be used.

The non-aqueous liquid electrolyte may contain at least one fluorinated solvent selected from the group consisting of fluoroethylene carbonate, methyl fluoropropionate, fluorobenzene, fluoromethyl methyl carbonate, and fluorodimethylene carbonate. Examples of the lithium salt that can be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. Not only can a lithium salt selected from these be used alone, but a mixture of two or more selected from these can also be used. The lithium salt concentration is, for example, between 0.5 to 2 mol/L.

The gel electrolyte can be a polymer material impregnated with a non-aqueous liquid electrolyte. Examples of the polymer material that can be used include polyethylene oxide, polyacrylonitrile, polyvinylidene fluoride, polymethyl methacrylate, and polymers having ethylene oxide bonds.

When an ionic liquid is used, the cation therein can be a quaternary cation with linear aliphatic chains, such as a tetraalkyl ammonium or tetraalkyl phosphonium; an ammonium with aliphatic ring(s), such as a pyrrolidinium, morpholinium, imidazolinium, tetrahydropyrimidinium, or piperidinium cation; or a nitrogen heteroaromatic cation, such as a pyridinium or imidazolium cation. The anion in the ionic liquid can be, for example, $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

At least one selected from the group consisting of the positive electrode 21, negative electrode 23, electrolyte layer 22, first electrolyte layer 26, and second electrolyte layer 27 may contain a binder added to improve adhesion between particles. Examples of the binder that can be used include polyvinylidene fluoride, polytetrafluoroethylene, polyethylene, polypropylene, aramid resin, polyamides, polyimides, polyamide-imides, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyether sulfones, hexafluoropolypropylene, styrene butadiene rubber, and carboxymethyl cellulose. The binder can be a copolymer of two or more materials selected from the group consisting of tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from these materials can also be used.

At least one selected from the group consisting of the positive electrode 21 and negative electrode 23 may contain a conductive additive added to increase electronic conductivity.

Examples of the conducive additive that can be used include graphite, such as natural and artificial graphite; carbon blacks, such as acetylene black and Ketjenblack; conductive fibers, such as carbon and metallic fibers; metallic powders, such as fluorinated carbon and aluminum powders; conductive whiskers, such as potassium titanate whiskers; conductive metal oxides, such as titanium oxide; and conductive polymers, such as polyaniline, polypyrrole, and polythiophene.

The shape of the conductive additive is not critical. The conductive additive can be in the shape of, for example, needles, flakes, spheres, or ellipsoids. The conductive additive can be particles.

The particulate positive electrode active material 24 and particulate negative electrode active material 25 may be coated with a coating material to have lower interfacial resistances. The coating material may cover part of the surface or the entire surface of the particulate positive electrode active material 24. Likewise, the coating material may cover part of the surface or the entire surface of the particulate negative electrode active material 25.

The coating material can be, for example, a solid electrolyte, such as a sulfide, oxide, halide, polymer, or complex hydride solid electrolyte. The coating material can be an oxide solid electrolyte. Oxide solid electrolytes exhibit superior stability at high potentials. The use of an oxide solid electrolyte as the coating material improves the charge and discharge efficiency of the battery 20.

Examples of the oxide solid electrolyte that can be used as the coating material include Li—Nb—O compounds, such as $LiNbO_3$; Li—B—O compounds, such as $LiBO_2$ and $Li_3BO_3$; Li-AI-O compounds, such as $LiAlO_2$; Li—Si—O compounds, such as $Li_4SiO_4$; Li—Ti—O compounds, such as $Li_2SO_4$ and $Li_4Ti_5O_{12}$; Li—Zr—O compounds, such as $Li_2ZrO_3$; Li—Mo—O compounds, such as $Li_2MoO_3$; Li-V-O compounds, such as $LiV_2O_5$; and Li—W—O compounds, such as $Li_2WO_4$.

EXAMPLES

Example 1

In a glove box filled with an Ar gas with a dew point of −60° C. or lower, some amounts of $Li_2S$ and $P_2S_5$ powders were weighed out so that the molar ratio $Li_2S:P_2S_5$ would be 75:25, and the powders taken were mixed and ground in a mortar. The mixture was milled using a planetary ball mill at a rotation speed of 510 rpm for 10 hours. The resulting vitreous solid electrolyte was heated at 270° C. for 15 minutes in an inert atmosphere. This gave a $Li_2S$—$P_2S_5$ powder as a glass-ceramic sulfide solid electrolyte material. The chemical composition of the sulfide solid electrolyte material of Example 1 is $Li_3PS_4$.

Example 2

A sulfide solid electrolyte material of Example 2 was obtained in the same way as in Example 1, except that the duration of heating was 30 minutes.

Comparative Example 1

A sulfide solid electrolyte material of Comparative Example 1 was obtained in the same way as in Example 1, except that no heat treatment was performed.

Comparative Example 2

A sulfide solid electrolyte material of Comparative Example 2 was obtained in the same way as in Example 1, except that the duration of heating was 5 minutes.

Comparative Example 3

A sulfide solid electrolyte material of Comparative Example 3 was obtained in the same way as in Example 1, except that the duration of heating was 120 minutes.

Comparative Example 4

A sulfide solid electrolyte material of Comparative Example 4 was obtained by exposing that of Comparative Example 3 to an atmosphere for 60 minutes at about 23° C. and about 50% RH. The resulting sulfide solid electrolyte material was stored in a glove box filled with an Ar gas with a dew point of −60° C. or lower.

$^{31}$P-NMR Measurements

The sulfide solid electrolyte materials of Examples 1 and 2 and Comparative Examples 1 to 4 were analyzed by $^{31}$P-NMR. The sample spinning frequency was 20 kHz, the number of scans was 32, and the relaxation time was 30 seconds. Ammonium phosphate was used as the chemical shift reference at 0 ppm. In the obtained spectra, the integrated intensity of each peak was derived by fitting. From the obtained integrated intensities of peaks, the relative amounts of the individual crystalline and vitreous phases (in mol %) were identified assuming that the total amount of the sulfide solid electrolyte material was 100 mol %. Moreover, the ratio of the integrated intensity of the peak for crystalline $PS_4$ to that of the peak for vitreous $PS_4$ was defined as x:(1−x), and the relative amount x of crystalline $PS_4$ (crystalline $PS_4$ content) was determined. The "relative amount x of crystalline $PS_4$" represents the amount, by the number of moles, of crystalline $PS_4$ determined as if the total amount of crystal and vitreous $PS_4$ were "1."

Measurement of Ionic Conductivity

The ionic conductivity of the sulfide solid electrolyte materials of Examples 1 and 2 and Comparative Examples 1 to 3 was measured as follows.

In an insulating cylinder, 80 mg of the sulfide solid electrolyte material was pressed into a layer at a pressure of 360 MPa. The thickness of the resulting electrolyte layer was measured using calipers. Metallic In foil (200-μm thick) was placed on the top and bottom surfaces of the electrolyte layer, and the layers of foil and the electrolyte layer were pressed together with a pressure of 80 MPa to give a laminate of metallic In foil, an electrolyte layer, and metallic In foil. A stainless steel current collector was placed on the top and bottom surfaces of the laminate, and a lead for current collection was attached to each current collector. Lastly, the insulating cylinder was sealed with an insulating ferrule to prevent the inside of the cylinder from being exposed to the external air. In this way, an electrochemical cell for the measurement of ionic conductivity was prepared.

This electrochemical cell was placed in a thermostatic chamber at 25° C. The resistance was measured by the AC impedance method with voltage swings of ±10 mV over the frequency range of 0.01 Hz to 1 MHz. From the measured resistance, the area of the electrodes, and the thickness of the electrolyte layer, the ionic conductivity was calculated.

Measurement of Hydrogen Sulfide Production

The hydrogen sulfide production of the sulfide solid electrolyte materials of Examples 1 and 2 and Comparative Examples 1 to 3 was measured as follows.

In a glove box filled with an Ar gas with a dew point of −60° C. or lower, 80 mg was weighed out of the sulfide solid electrolyte material. The material was transferred into a powder compaction die with an inner diameter of 9.5 mm and pressed into a pellet at a pressure of 360 MPa. The pellet was removed from the die and placed in a sealable glass container. The glass container was placed in a humidified thermostatic chamber at a temperature of 25° C. and 50% RH, and the inside was purged with a humid atmosphere. The glass container was then sealed to expose the pellet to the humid atmosphere for 10 minutes. At 10 minutes after sealing, the amount of hydrogen sulfide in the container was measured using a portable gas monitor (Riken Keiki GX-2012). Hydrogen sulfide production per unit weight ($cm^3/g$) was derived by dividing the amount of hydrogen sulfide by the weight of the pellet (80 mg).

Figure 3:
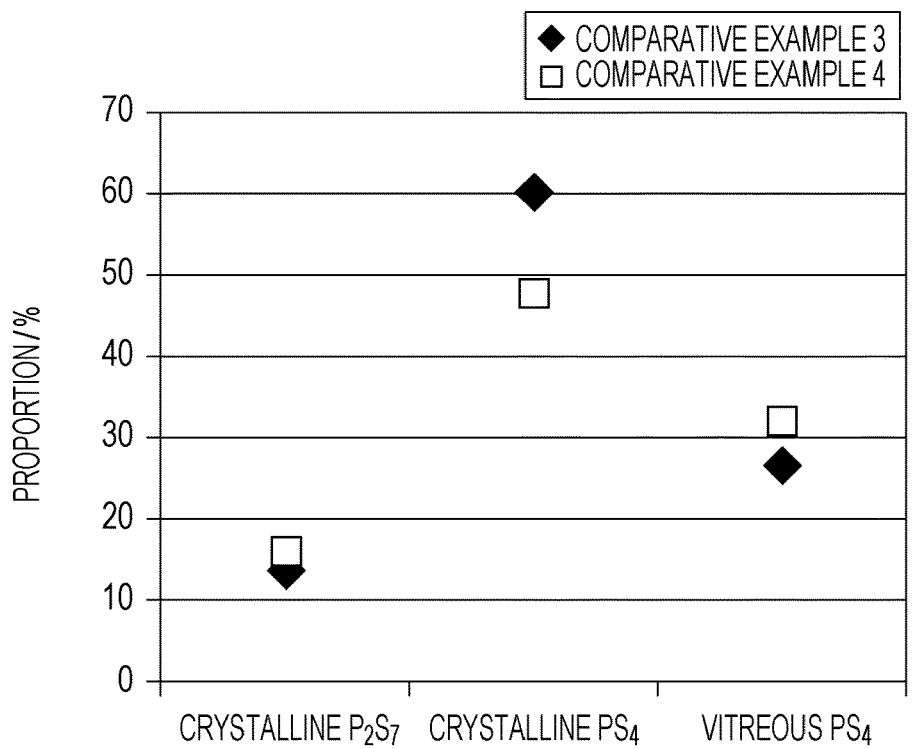
FIG. 3 is a graph that illustrates the proportions of crystalline $P_2S_7$, crystalline $PS_4$, and vitreous $PS_4$ in the sulfide solid electrolyte materials of Comparative Examples 3 and 4.

Table 1 presents the results of $^{31}$P-NMR for the sulfide solid electrolyte materials of Comparative Examples 3 and 4. FIG. 3 is a graphical representation of the values in Table 1.

TABLE 1

| | Comparative Example 3 | Comparative Example 4 |
|---|---|---|
| Crystalline $P_2S_7$ | 13.3% | 15.8% |
| Crystalline $PS_4$ | 60.3% | 47.8% |
| Vitreous $PS_4$ | 26.4% | 32.0% |

As shown in Table 1, exposing a sulfide solid electrolyte material reduced the relative amount of crystalline $PS_4$. The decrease in crystalline $PS_4$ content means that atmospheric moisture reacted with crystalline $PS_4$, breaking P—S bonds and causing hydrogen sulfide to form. The proportions of crystalline $P_2S_7$ and vitreous $PS_4$ were preserved, which means that crystalline $PS_4$ is the main cause of the generation of hydrogen sulfide. As can be seen from the preserved crystalline $P_2S_7$ content, hydrogen sulfide production depends not on the total percentage of crystalline phases but on the percentage of crystalline $PS_4$ in the sulfide solid electrolyte material.

Figure 4:
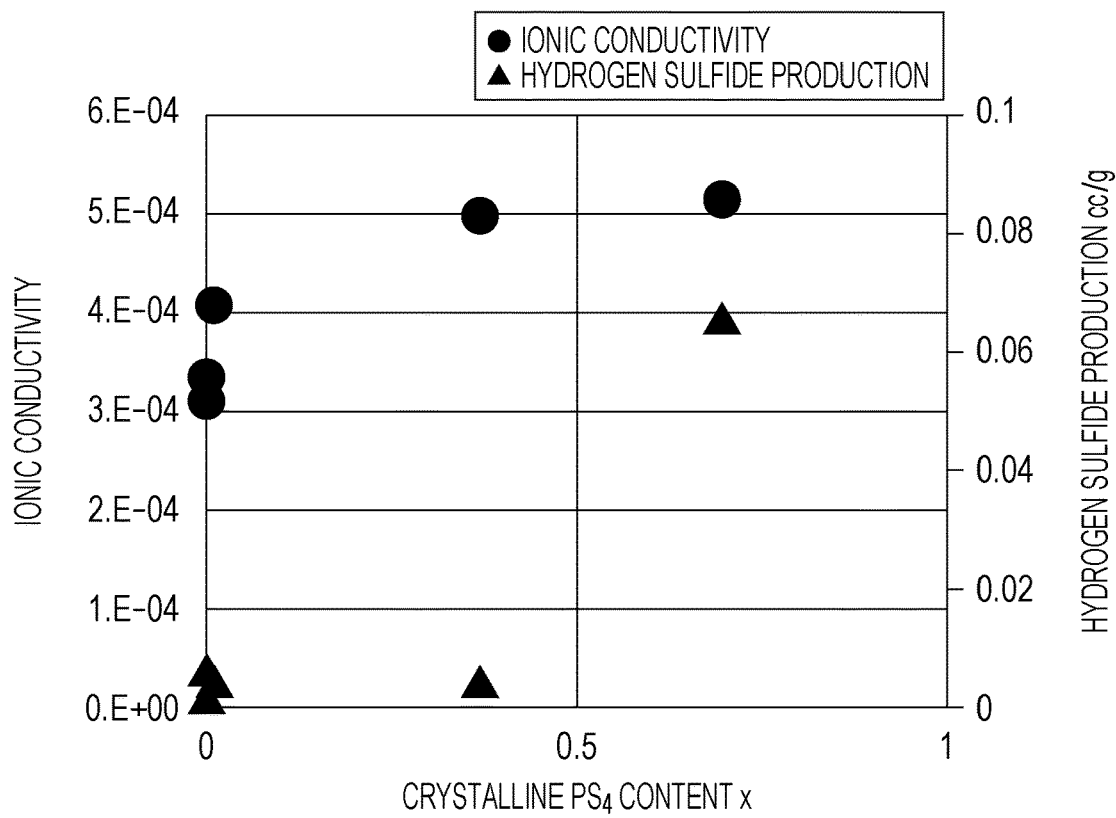
FIG. 4 is a graph that illustrates the relationship between crystalline $PS_4$ content x and ionic conductivity and that between x and hydrogen sulfide production.
Figure 5:
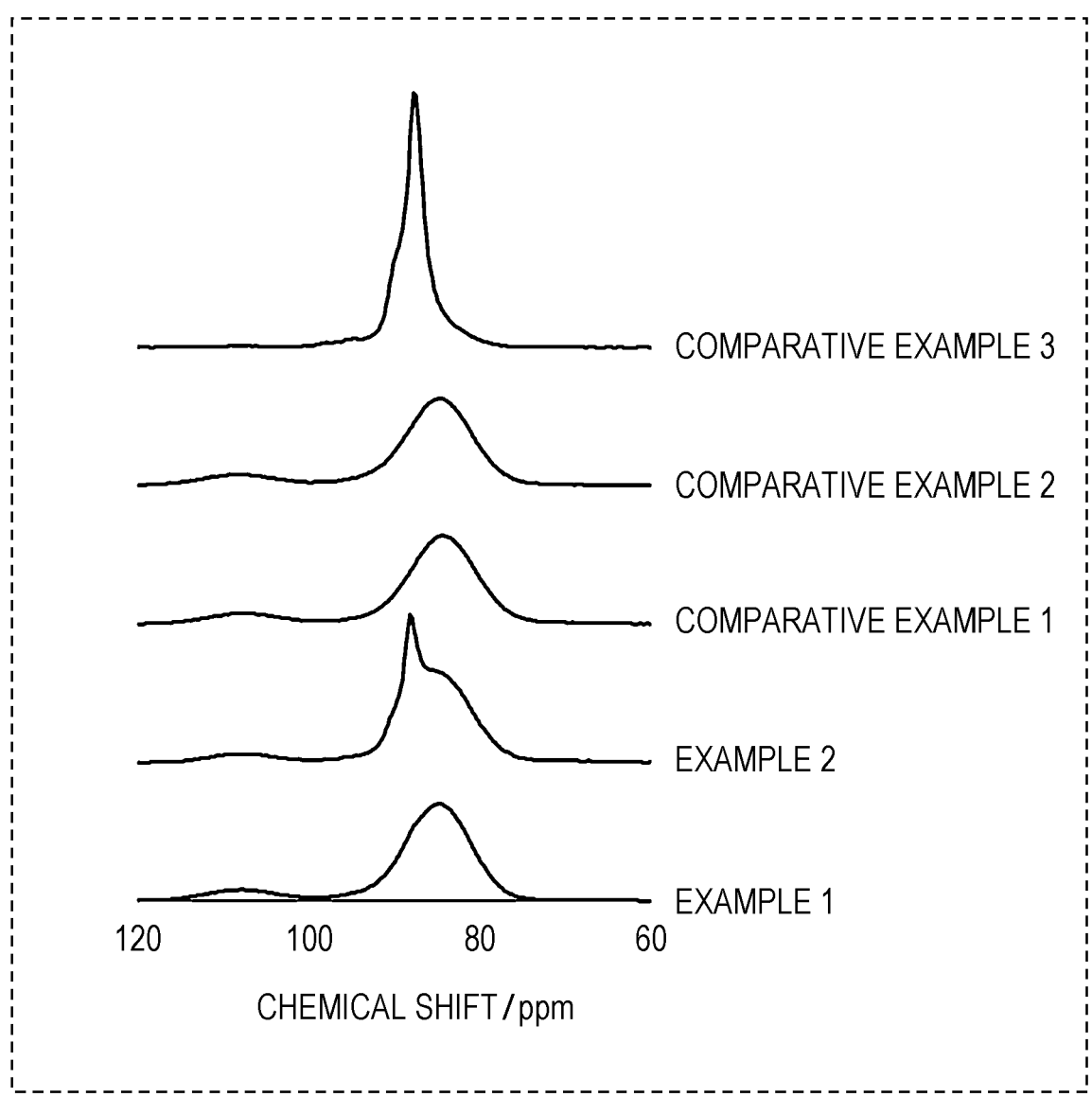
FIG. 5 presents NMR spectra obtained in Examples 1 and 2 and Comparative Examples 1, 2, and 3.

Table 2 summarizes the position of the first peak (for crystalline $PS_4$) and second peak (for vitreous $PS_4$) and the relative amount x of crystalline $PS_4$ in $^{31}$P-NMR and measured ionic conductivity and hydrogen sulfide production for the sulfide solid electrolyte materials of Examples 1 and 2 and Comparative Examples 1 to 3. The position of the first and second peaks was determined by Gaussian curve fitting of the $^{31}$P-NMR spectrum. FIG. 4 is a graphical representation of the values in Table 2. FIG. 5 presents the NMR spectrum for Examples 1 and 2 and Comparative Examples 1, 2, and 3.

TABLE 2

| | Position of first peak (ppm) | Position of second peak (ppm) | Crystalline $PS_4$ content x | Ionic conductivity (S/cm) | Hydrogen sulfide production ($cm^3/g$) |
|---|---|---|---|---|---|
| Example 1 | 87.89 | 84.68 | 0.00926 | $4.1 \times 10^{-4}$ | $4.5 \times 10^{-3}$ |
| Example 2 | 88.08 | 85.19 | 0.370 | $5.0 \times 10^{-4}$ | $4.6 \times 10^{-3}$ |
| Comparative Example 1 | — | 84.23 | 0 | $3.1 \times 10^{-4}$ | $2.1 \times 10^{-3}$ |
| Comparative Example 2 | — | 84.68 | 0 | $3.3 \times 10^{-4}$ | $6.4 \times 10^{-3}$ |
| Comparative Example 3 | 88.14 | 85.01 | 0.695 | $5.1 \times 10^{-4}$ | $6.6 \times 10^{-2}$ |

As can be seen from the results for Examples 1 and 2 and Comparative Examples 1, 2, and 3, the first and second peaks appeared near 88.0 ppm (in a range of not less than 87.5 ppm and not more than 88.5 ppm) and near 84.7 ppm (in a range of not less than 84.2 ppm and not more than 85.2 ppm), respectively. As shown by the results for Examples 1 and 2 and Comparative Example 3, ionic conductivity and hydrogen sulfide production increased with increasing crystalline $PS_4$ content x. Moreover, as can be understood from the results for Comparative Examples 1 and 2, a crystalline $PS_4$ content x smaller than 0.00926 led to a sufficiently small hydrogen sulfide production, less than $10^{-2}$ $cm^3/g$, but caused a low ionic conductivity, less than $4 \times 10^{-4}$ S/cm. With a sulfide solid electrolyte material whose ionic conductivity is less than $4 \times 10^{-4}$ S/cm, high-power operation of the battery can be difficult. As can be seen from the results for Comparative Example 3, a crystalline $PS_4$ content x larger than 0.37 led to an ionic conductivity higher than $4 \times 10^{-4}$ S/cm but caused a hydrogen sulfide production larger than $10^{-2}$ $cm^3/g$. In the fabrication of a battery with a sulfide solid electrolyte material whose hydrogen sulfide production is larger than $10^{-2}$ $cm^3/g$, a concern is that a minute amount of atmospheric water reacts with the electrolyte material during the fabrication process, affecting the quality of the material and thereby impairing the performance of the battery. A sulfide solid electrolyte material with a crystalline $PS_4$ content x meeting $0.00926 \leq x \leq 0.37$ combines high ionic conductivity with low hydrogen sulfide production.

INDUSTRIAL APPLICABILITY

The technologies disclosed herein are useful for, for example, all-solid-state lithium secondary batteries.

What is claimed is:

1. A sulfide solid electrolyte material comprising phosphorus and sulfur, wherein
    x satisfies $0.00926 \leq x \leq 0.37$, where
    a first peak is a peak in a range of not less than 87.5 ppm and not more than 88.5 ppm, the peak being determined by Gaussian curve fitting of a $^{31}$P-NMR spectrum,
    a second peak is a peak in a range of not less than 84.2 ppm and not more than 85.2 ppm, the peak being determined by Gaussian curve fitting of the $^{31}$P-NMR spectrum,
    and a ratio of integrated intensity of the first peak to integrated intensity of the second peak is represented by x:1−x.

2. The sulfide solid electrolyte material according to claim 1, wherein
    the sulfide solid electrolyte material is a compound consisting essentially of lithium, phosphorus, and sulfur.

3. The sulfide solid electrolyte material according to claim 2, wherein
    the compound has a chemical composition of $Li_3PS_4$.

4. The sulfide solid electrolyte material according to claim 1, wherein
the sulfide solid electrolyte material contains $Li_3PS_4$.

5. A battery comprising:
a positive electrode;
a negative electrode; and
an electrolyte layer between the positive electrode and the negative electrode, wherein:
at least one selected from the group consisting of the positive electrode, negative electrode, and electrolyte layer contains a sulfide solid electrolyte material; and
the sulfide solid electrolyte material contains
phosphorus and sulfur, and
x satisfies $0.00926 \leq x \leq 0.37$, where
a first peak is a peak in a range of not less than 87.5 ppm and not more than 88.5 ppm, the peak being determined by Gaussian curve fitting of a $^{31}$P-NMR spectrum,
a second peak is a peak in a range of not less than 84.2 ppm and not more than 85.2 ppm, the peak being determined by Gaussian curve fitting of the $^{31}$P-NMR spectrum,
and a ratio of integrated intensity of the first peak to integrated intensity of the second peak is represented by $x:1-x$.

6. The battery according to claim 5, wherein:
the electrolyte layer includes a first electrolyte layer and a second electrolyte layer covered with the first electrolyte layer; and
the first electrolyte layer contains a larger amount, on a mass basis, of the sulfide solid electrolyte material than the second electrolyte layer.

\* \* \* \* \*